Patented May 7, 1935

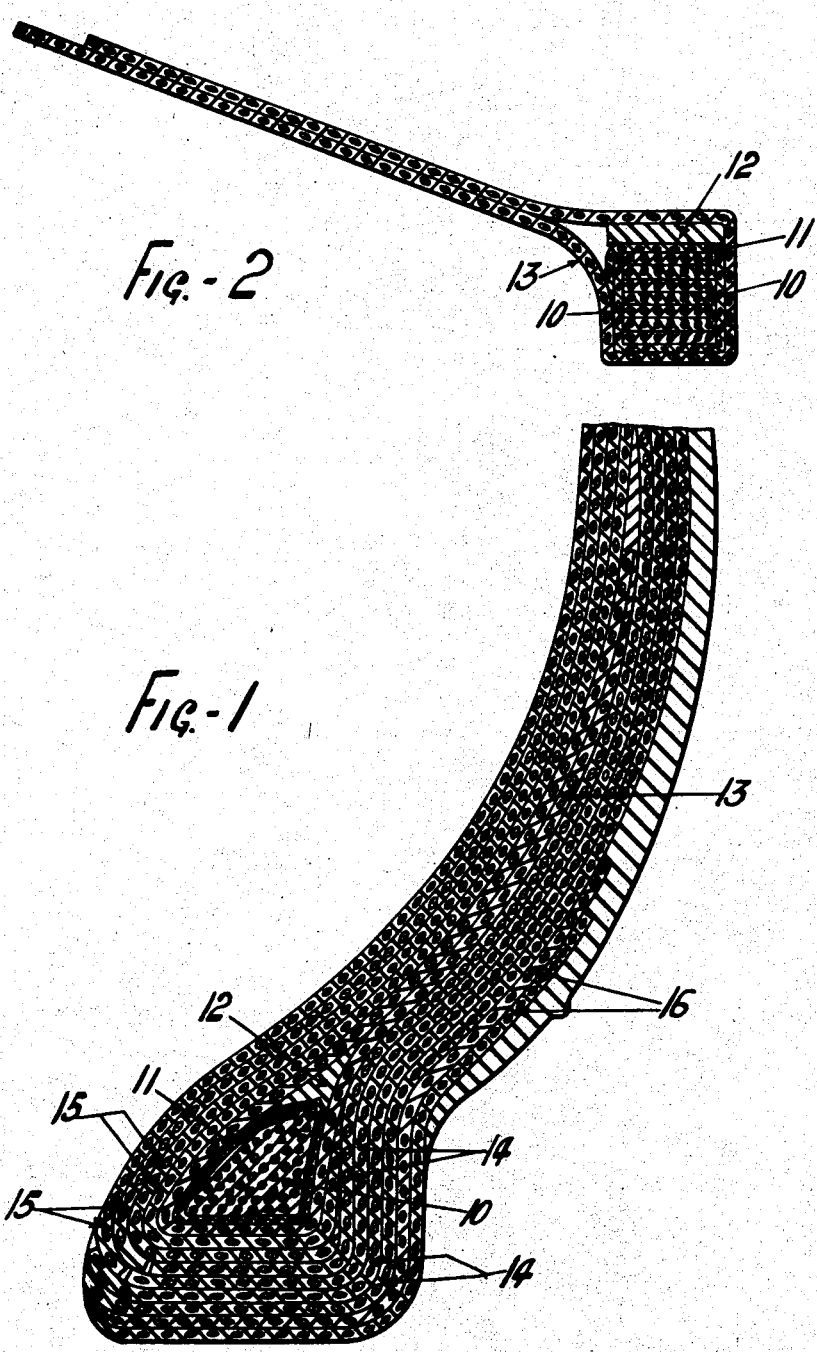

2,000,869

UNITED STATES PATENT OFFICE 2,000,869

TIRE CONSTRUCTION

Raymond S. Taylor, Akron, Ohio, assignor to The Firestone Tire & Rubber Company, Akron, Ohio, a corporation of Ohio Application July 11, 1933, Serial No. 679,917

8 Claims. (Cl. 152—13)

This invention relates to tire constructions and more especially it relates to improvements in pneumatic tire casings at the bead portions thereof.

Pneumatic tires used on trucks and buses, and in some other situations, are subject to extremes of heat in their bead portions due in part to the large brakes used on these types of vehicles. In tires constructed of the usual rubber compositions these extreme heat conditions cause all the sulphur in the composition to be combined after which a chemical reaction known as "reversion" or "depolymerization" takes place, with the result that the rubber becomes very soft and lifeless, permitting the fabric plies readily to pull apart and the bead core to become loose, and causing the tire to fail at relatively low mileage.

The chief object of the invention is to prevent the failure of tire casings due to extreme heat conditions in the bead portions thereof. More specifically, the invention aims to provide a tire construction with a special rubber composition localized in the bead portions thereof, which rubber composition is not subject to reversion at high temperatures.

Of the accompanying drawing:

Figure 1 is a radial section through a bead portion of a molded and vulcanized pneumatic tire casing embodying the invention, in its preferred form; and Figure 2 is a transverse section of a bead core and attached flipper made according to this invention, as they appear before being incorporated in the tire casing shown in Figure 1.

Briefly, the invention consists of a pneumatic tire casing having an excessive amount of free sulphur localized in the bead regions thereof. The presence of the large amount of free sulphur inhibits reversion of the rubber composition when the bead portions of the tire are subjected to extreme heat conditions during use. The sulphur is incorporated in the tire in rubber composition of high sulphur content, which composition may be used as a friction or skim coating on fabric that is local to the bead regions of the tire, such as bead reinforcing strips and chafer strips, or the composition may be in the form of gum strips applied at different points around the bead cores of the tire either between the fabric plies or on the surface thereof. There is such an excess of sulphur in the said rubber composition that but a small portion of the sulphur is combined with the rubber during vulcanization of the tire, the excess remaining as free sulphur.

During vulcanization and thereafter the free sulphur in the tire migrates to the adjacent plies, thus bringing into effect the protecting action of the excess sulphur to the entire bead areas of the tire.

Referring to the drawing, there is shown in Figure 2 a cross-section of an annular bead core assembly comprising a core consisting of multiplicity of circumferentially extending wires 10, 10 embedded in rubber composition, an inner reinforcing wrapper 11 thereabout, a circumferentially extending strip of rubber composition 12 on the outer periphery of wrapper 11, and an outer reinforcing strip 13 that encloses the aforesaid elements and has its marginal portions joined in face to face relation and extended laterally to constitute a flipper. The reinforcing strips 11, 13 have their opposite faces frictioned and skim coated with rubber composition of high sulphur content, the other elements of the bead core assembly comprising rubber composition of normal sulphur content.

As is shown in Figure 1, upon incorporation in a tire casing, the reinforcing strips 11, 13 are disposed substantially centrally of the bead regions of the tire, between the over-bead and under-bead fabric plies 14, 15 respectively, which fabric plies are rubberized with rubber composition of normal sulphur content. The tire structure also includes a pair of chafer strips 16, 16 on the inner periphery and outer face of its bead portions, said chafer strips being coated with the rubber composition of high sulphur content. The construction described has been found to give satisfactory results, but it will be understood that the invention is not limited to the disposition of the high sulphur rubber composition as described, and that said composition may be otherwise disposed in the bead regions of the tire without departing from the spirit of the invention and without sacrificing the advantages thereof.

In the manufacture of the rubber composition of high sulphur content, the plastic unvulcanized rubber is loaded with substantially all the sulphur that can be mixed with it, the sulphur content of the mix usually being an amount that is equal to about 56% of the amount of the rubber therein. Accelerators cannot be mixed on a mill with rubber of high sulphur content because of scorching, so that it is required to mix a separate batch of low sulphur rubber composition containing accelerators, and apply such composition as a coating on fabric that previously has been coated with the rubber of high sulphur content. On the chafer strips 16 the coating of rubber containing accelerators will be disposed between the two strips.

Aside from the use of rubber composition of high sulphur content in the bead regions of the tire as described, the tire is of usual construction and is vulcanized in the usual or any suitable manner. The rubber of high sulphur content is somewhat stiffer after vulcanization than ordinary rubber composition, and since but a small percentage of sulphur is required to effect vulcanization it will be obvious that there will be a relatively large amount of free, uncombined sulphur in the bead regions of the finished tire, although some of this sulphur will migrate to adjacent regions during vulcanization. Under the extreme heat conditions incidental to use, the free sulphur further migrates and causes a further stiffening of the rubber in the bead regions of the tire, and effectively prevents the softening of the rubber due to reversion.

Although the sulphur content stated (56% of the amount of the rubber) has been found to give optimum results, the proportion of sulphur may be reduced without sacrificing all of the advantages of the invention. Experience has shown that reducing the proportion of sulphur from the amount stated reduces the protection against bead failure in a more or less proportionate degree.

Used in bus and truck tires subject to extreme heat conditions at the beads, the invention prolongs the life of the tire, practically eliminates bead separation failures, and achieves the other objects set out in the foregoing statement of objects.

Modification may be resorted to without departing from the spirit of the invention or the scope of the appended claims, which are not limited wholly to the specific construction shown and described.

What is claimed is:
1. A tire construction consisting of a pneumatic tire casing having an excessive amount of free sulphur in the bead regions thereof as compared to other parts of the tire.

2. A tire construction consisting of a pneumatic tire casing having an excess of free sulphur in the bead regions thereof sufficient to inhibit depolymerization of the rubber under conditions of extreme heat.

3. A vulcanized tire construction consisting of a pneumatic tire casing having localized plies in the bead regions thereof, which plies contain rubber of excessive combinable sulphur content as compared to the other plies of said bead region.

4. A vulcanized tire construction consisting of a pneumatic tire casing having localized plies in the bead regions thereof, which plies contain rubber having such a high combinable sulphur content that during and after vulcanization there is migration of said sulphur to adjacent plies sufficient to prevent depolymerization of the rubber in said adjacent plies under conditions of extreme heat.

5. A tire construction consisting of a pneumatic tire casing having a localized ply in each bead region thereof, which ply contains rubber composition of which the sulphur content is substantially the maximum amount that can be incorporated in the composition.

6. A tire construction as defined in claim 5 in which the sulphur content of the rubber composition of the localized plies is substantially 50% of the weight of the rubber in said plies.

7. A vulcanized tire construction consisting of a pneumatic tire casing having respective bead reinforcing plies comprising rubber of excessive combinable sulphur content as compared to the other carcass plies of the tire.

8. A tire construction as defined in claim 7 including chafer strips comprising rubber of the same high sulphur content as the bead reinforcing plies.

RAYMOND S. TAYLOR.